United States Patent
Ito et al.

(10) Patent No.: US 10,001,152 B2
(45) Date of Patent: Jun. 19, 2018

(54) FLUID TRANSPORT PIPE

(71) Applicants: TOYOTA JIDOSHA KABUSHIKI KAISHA, Toyota-shi, Aichi-ken (JP); NATIONAL UNIVERSITY CORPORATION TOKYO UNIVERSITY OF AGRICULTURE & TECHNOLOGY, Fuchu-shi, Tokyo (JP)

(72) Inventors: Hirokazu Ito, Susono (JP); Tsuneo Tsutsui, Gotenba (JP); Naoki Takeuchi, Susono (JP); Kaoru Iwamoto, Fuchu (JP)

(73) Assignees: TOYOTA JIDOSHA KABUSHIKI KAISHA, Toyota-shi (JP); NATIONAL UNIVERSITY CORPORATION TOKYO UNIVERSITY OF AGRICULTURE & TECHNOLOGY, Fuchu-shi (JP)

( * ) Notice: Subject to any disclaimer, the term of this patent is extended or adjusted under 35 U.S.C. 154(b) by 0 days. days.

(21) Appl. No.: 15/502,336

(22) PCT Filed: Aug. 11, 2015

(86) PCT No.: PCT/JP2015/004025
§ 371 (c)(1),
(2) Date: Feb. 7, 2017

(87) PCT Pub. No.: WO2016/027438
PCT Pub. Date: Feb. 25, 2016

(65) Prior Publication Data
US 2017/0227029 A1   Aug. 10, 2017

(30) Foreign Application Priority Data
Aug. 22, 2014 (JP) ................. 2014-169669

(51) Int. Cl.
F15D 1/04 (2006.01)
F15D 1/02 (2006.01)
(Continued)

(52) U.S. Cl.
CPC ............. *F15D 1/025* (2013.01); *F15D 1/065* (2013.01); *F16L 55/02709* (2013.01)

(58) Field of Classification Search
CPC ..... F16L 55/02709; F15D 1/025; F15D 1/065
(Continued)

(56) References Cited

U.S. PATENT DOCUMENTS 3,165,123 A * 1/1965 Hawkins ................. F15D 1/065
114/67 R
8,025,271 B2 * 9/2011 Kolodner ................ F15D 1/065
261/76
(Continued)

FOREIGN PATENT DOCUMENTS

JP    5105292 B2    12/2012

OTHER PUBLICATIONS

Mamori et al., "Direct numerical simulation of turbulent flow in periodically converging-diverging pipe with drag reduction effect", Fluids Engineering Conference, The Japan Society of Mechanical Engineers (2013), 2 pages.
(Continued)

*Primary Examiner* — Patrick F Brinson
(74) *Attorney, Agent, or Firm* — Hunton Andrews Kurth LLP

(57) ABSTRACT

The invention relates to a fluid transport pipe. A first unit channel in which a channel cross-sectional area continuously decreases toward a downstream side and a second unit channel in which a channel cross-sectional area continuously increases toward the downstream side are alternately combined. A ratio A $(=L/\{[Smax]^{1/2}-[Smin]^{1/2}\})$ is set
(Continued)

within a range in which a drag reduction rate $R_D$ becomes a positive value. The fluid transport pipe includes: a first opening formed in a channel wall of the first unit channel; a second opening formed in a channel wall of the second unit channel; and a bypass channel that allows by-passing of a flow from the first unit channel to the second unit channel through the openings.

7 Claims, 5 Drawing Sheets

(51) Int. Cl.
    *F16L 55/027*     (2006.01)
    *F15D 1/06*     (2006.01)
(58) Field of Classification Search
    USPC ........................ 138/114, 37–39, 42, 177, 178
    See application file for complete search history.

(56) References Cited

U.S. PATENT DOCUMENTS

| | | | |
|---|---|---|---|
| 9,046,115 B1* | 6/2015 | England | F15D 1/025 |
| 9,631,959 B1* | 4/2017 | Wang | F15D 1/025 |
| 2006/0207672 A1* | 9/2006 | Henriksson | F16L 55/045 |
| | | | 138/37 |
| 2015/0184806 A1* | 7/2015 | Beg | F17D 1/02 |
| | | | 137/12 |

OTHER PUBLICATIONS

Yanagisawa et al., "Influence of Periodically Converging-Diverging Pipe Shape on Drag Reduction Effect", The Society of Mechanical Engineers Kanto Branch General Meeting Lecture Proceedings, The Japan Society of Mechanical Engineers (2014), 2 pages.

* cited by examiner

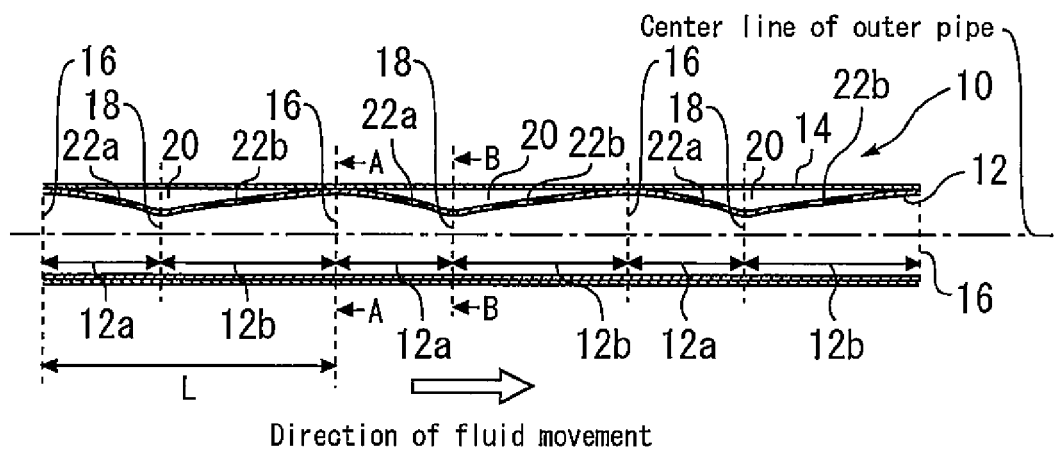
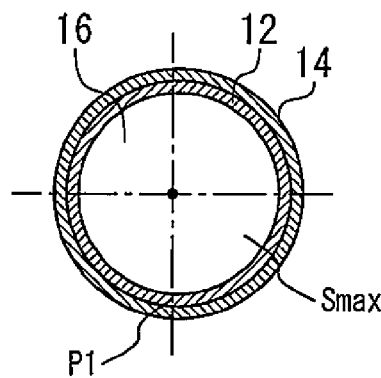 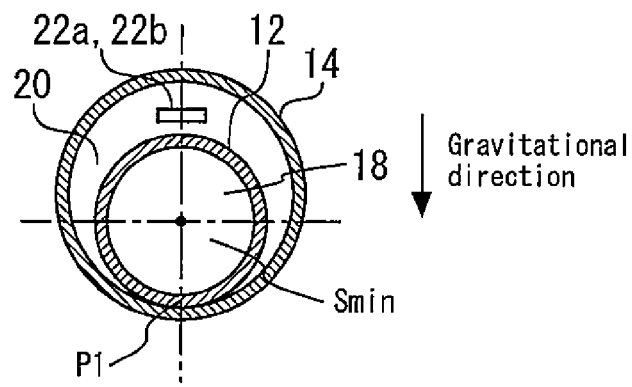
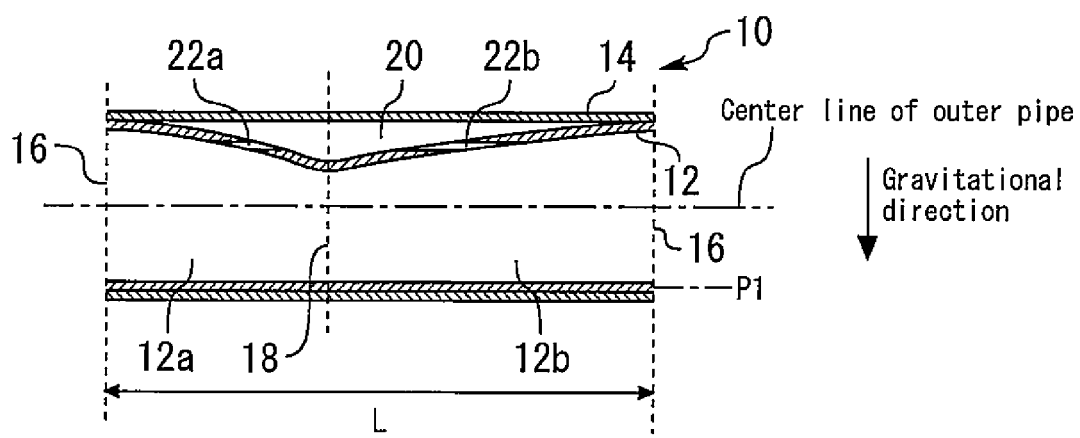

Direction of fluid movement

Direction of fluid movement

Direction of fluid movement

FLUID TRANSPORT PIPE

CROSS-REFERENCE TO RELATED APPLICATIONS

This is a national phase application based on the PCT International Patent Application No. PCT/JP2015/004025 filed Aug. 11, 2015, claiming priority to Japanese Patent Application No. 2014-169669 filed Aug. 22, 2014, the entire contents of both of which are incorporated herein by reference.

TECHNICAL FIELD

The present invention relates to a fluid transport pipe.

BACKGROUND ART

Transportation of fluids by means of circular pipes and the like is widely utilized in daily life and in the industrial field. In a fluid transport pipe that is constructed as a circular pipe, friction drag is the dominant drag with respect to the total drag acting within the pipe, and the friction drag increases markedly at a turbulent flow in comparison to a laminar flow. Accordingly, relaminarization from a turbulent flow to a laminar flow is effective for conserving energy during transportation of a fluid. In Patent Literature 1 that is mentioned hereunder, a technique is disclosed that causes the flow of a fluid flowing inside a pipe to pulsate by periodically accelerating and decelerating the flow of fluid by controlling a pump that pressure-feeds the fluid, and thus achieves a drag reduction effect (particularly, a friction reduction effect) by relaminarization of the flow.

Further, in each of Non Patent Literatures 1 and 2 mentioned hereunder, a fluid transport pipe is described that is configured so as to obtain a drag reduction effect without requiring the above described pump control by adopting a pipe shape in which a channel cross-sectional area is periodically enlarged and reduced in a flow direction (direction of fluid movement within the pipe).

CITATION LIST

Patent Literature

PTL 1: Japanese Patent No. 5105292

Non Patent Literature

NPL 1: Mamori H. and 4 others, "Teikou Teigen Kouka Wo Yusuru Shuukiteki Kaku-daishukushou Enkannai No Nagare No Chokusetsu Suuchi Keisan", Nihon Kikai Gakkai Ryuutai Kougakubumon Kouenkai Kouen Ronbunshu (9-10 Nov. 2013, Fukuoka) (in Japanese)

NPL 2: Yanagisawa H. and 3 others, "Shuukiteki Kakudai-shukushoukan Keijyou No Teikou Teigen Kouka Ni Ataeru Eikyou", Nihon Kikai Gakkai Kantou Shibu 20 Ki Soukai Kouenkai Kouen Ronbunshu (14-15 Mar. 2014, Tokyo) (in Japanese)

SUMMARY OF INVENTION

It is considered that, in the fluid transport pipe having the pipe shape described in each of the aforementioned Non Patent Literatures 1 and 2, a further drag reduction effect will be obtained if the occurrence of turbulence in the flow in the vicinity of a channel wall can be further suppressed.

The present invention has been made to address the above described problem, and an object of this invention is to enable the obtainment of a further drag reduction effect in a fluid transport pipe in which a channel cross-sectional area is periodically enlarged and reduced in a direction of movement of a fluid.

A fluid transport pipe according to the present invention includes a first unit channel and a second unit channel. In the first unit channel, a channel cross-sectional area continuously decreases toward a downstream side. The second unit channel is a unit channel that is alternately combined with the first unit channel, and in which a channel cross-sectional area continuously increases toward the downstream side. The fluid transport pipe is configured so that, in a relation between a ratio obtained by dividing a total channel length of the first unit channel and the second unit channel by a difference between a root of a maximum area of a channel cross-section of the fluid transport pipe and a root of a minimum area of the channel cross-section, and a rate of reduction in a total drag that acts inside the fluid transport pipe in comparison to a reference pipe that is defined as described hereunder, the ratio is set within a range in which the rate of reduction in the total drag becomes a positive value. The reference pipe corresponds to a pipe in which a channel cross-sectional area is constant at an average channel cross-sectional area of a channel cross-section of a pair of the first unit channel and the second unit channel, and in which a total channel length of the pipe is equal to a total channel length of the fluid transport pipe. The fluid transport pipe according to the present invention further includes a first opening, a second opening and a bypass channel. The first opening is formed in a channel wall of the first unit channel at a site that is located on an inner side in a radial direction relative to an inner wall of a maximum area portion at which the maximum area is obtained. The second opening is formed in a channel wall of the second unit channel at a site that is located on an inner side in a radial direction relative to the inner wall of the maximum area portion. The bypass channel is formed on an outer side of the first unit channel and the second unit channel, and that allows communication between the first opening and the second opening that are adjacent in a form in which a minimum area portion at which the minimum area is obtained is interposed between the first opening and the second opening.

The fluid transport pipe may be a double pipe including, as an inner pipe, a pipe that is obtained by alternately combining the first unit channel and the second unit channel, and including, as an outer pipe, a pipe having an inner wall into which an outer wall of the maximum area portion in the inner pipe is fitted.

A sensor that detects a parameter of a fluid that flows through the bypass channel may be mounted in the outer pipe.

A branch pipe having a branch channel that branches from the bypass channel may be connected to the outer pipe.

A confluence pipe having a merging channel that merges with the bypass channel may be connected to the outer pipe.

A fluid that is an object of transportation by the fluid transport pipe may be a gas; a direction of movement of a fluid may be a horizontal direction or an inclined direction relative to a vertical direction; and a channel wall at a lower edge position in a gravitational direction in the first unit channel and the second unit channel may be parallel to the direction of movement.

A fluid that is an object of transportation by the fluid transport pipe may be a liquid;

a direction of movement of a fluid may be a horizontal direction or an inclined direction relative to a vertical direction; and a channel wall at an upper edge position in a gravitational direction in the first unit channel and the second unit channel may be parallel to the direction of movement.

According to the present invention, turbulence growth inside a second unit channel that is on an increasing side of a channel cross-section can be suppressed while favorably maintaining a flow laminarization effect by means of a first unit channel that is on a decreasing side of the channel cross-section. As a result, a further drag reduction effect can be achieved.

BRIEF DESCRIPTION OF DRAWINGS

FIG. 1 is a longitudinal section obtained by cutting one part of a fluid transport pipe according to Embodiment 1 of the present invention at a position that passes through the center line of an outer pipe of the fluid transport pipe;

FIG. 2(A) and FIG. 2(B) are views that include cross-sectional views obtained by cutting the fluid transport pipe at a position (line A-A) of a maximum area portion and a position (line B-B) of a minimum area portion in FIG. 1, respectively;

FIG. 3 is a view illustrating, in an enlarged manner, a pair of a first unit channel and a second unit channel that are shown in FIG. 1;

DESCRIPTION OF EMBODIMENTS

Figure 4:
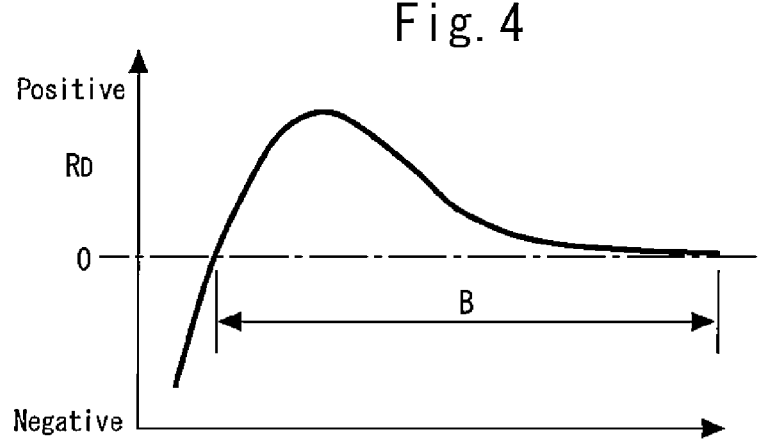
FIG. 4 is a view for describing a setting relating to a shape of a channel of an inner pipe of the fluid transport pipe shown in FIG. 1.

Hereunder, embodiments of the present invention are described with reference to the accompanying drawings. Note that, for the respective drawings, constituent elements that are the same or similar are assigned the same reference characters. The present invention is not limited to the embodiments described hereunder, and various modifications can be made without departing from the spirit and scope of the present invention.

Embodiment 1

Hereunder, Embodiment 1 of the present invention is described referring to FIG. 1 to FIG. 5(B). FIG. 1 is a longitudinal section obtained by cutting one part of a fluid transport pipe 10 according to Embodiment 1 of the present invention at a position that passes through the center line of an outer pipe 14 of the fluid transport pipe 10. FIG. 2(A) and FIG. 2(B) are views that include cross-sectional views obtained by cutting the fluid transport pipe 10 at a position (line A-A) of a maximum area portion 16 and a position (line B-B) of a minimum area portion 18 in FIG. 1, respectively. That is, FIG. 2(A) and FIG. 2(B) illustrate cross-sections that are perpendicular to a direction of movement of a fluid. FIG. 3 is a view illustrating, in an enlarged manner, a pair of a first unit channel 12a and a second unit channel 12b that are shown in FIG. 1.

The use of the fluid transport pipe 10 of the present embodiment is not particularly limited, and as one example the fluid transport pipe 10 can be favorably applied to a pipe for transporting a fluid required for operation of an internal combustion engine. Further, according to the present embodiment, as one example, it is assumed that a gas is used as a fluid that is an object of transportation by the fluid transport pipe 10. If the fluid is a gas, in the case of an internal combustion engine the fluid transport pipe 10 can be applied to, for example, an intake pipe that transports air, an exhaust pipe or an EGR pipe that transports exhaust gas, or a fuel pipe that transports a gas fuel.

In the present description, as shown in FIG. 1, a direction in which a fluid moves from an upstream side toward a downstream side inside the fluid transport pipe 10 is referred to as "direction of fluid movement". Further, in the present description, a cross-section that is perpendicular to the direction of fluid movement is referred to simply as "channel cross-section," and the area of the cross-section is referred to simply as "channel cross-sectional area". Note that, in the case of a straight pipe in which there is no change in the channel cross-sectional area, such as the outer pipe 14 of the fluid transport pipe 10, the "direction of fluid movement" is a direction that is parallel to the center line of the straight pipe.

The fluid transport pipe 10 is constructed as a double pipe that includes an inner pipe 12 and the outer pipe 14. As shown in FIG. 1, a channel that is obtained by repeatedly linking the first unit channel 12a and the second unit channel 12b in an alternating manner is formed inside the inner pipe 12.

The first unit channel 12a is formed so that the channel cross-sectional area continuously decreases toward the downstream side. On the other hand, the second unit channel 12b is formed so that the channel cross-sectional area continuously increases toward the downstream side. That is, the inner pipe 12 is constructed as a pipe in which the channel cross-sectional area periodically increases and decreases. In the configuration example of the present embodiment, the cross-sectional shape of the maximum area portion 16 at which the channel cross-sectional area of the inner pipe 12 becomes a maximum area Smax is a circle as shown in FIG. 2(A), and the cross-sectional shape of the minimum area portion 18 at which the channel cross-sectional area becomes a minimum area Smin is also a circle as shown in FIG. 2(B).

The outer pipe 14 is constructed as a pipe that has an inner wall into which an outer wall of the maximum area portion 16 of the inner pipe 12 is fitted. That is, in the configuration example of the present embodiment, to conform to the fact that the cross-sectional shape of the maximum area portion 16 is circular, the cross-sectional shape of the outer pipe 14 is also circular, and the outer diameter of the maximum area portion 16 and the inner diameter of the outer pipe 14 are equal. The channel cross-sectional area of the outer pipe 14 is constant and does not change accompanying a positional change in the direction of fluid movement. That is, the outer pipe 14 of the present embodiment is a circular pipe that is a straight pipe.

In the inner pipe 12 of the fluid transport pipe 10, as shown in FIG. 2(A) and FIG. 2(B), the channel center of the maximum area portion 16 and the channel center of the minimum area portion 18 are not collinear with respect to a straight line that is parallel to the direction of fluid movement, and are instead eccentric in the vertical direction. More specifically, the channel of the inner pipe 12 is formed so that respective lower edge positions P1 in the gravitational direction of each of the channel cross-sections of the unit channels 12a and 12b are aligned on a straight line that is parallel to the direction of fluid movement. In other words, in the inner pipe 12, the channel wall at the lower edge position P1 in the gravitational direction is parallel to the direction of fluid movement. Note that, although in this case a configuration example is illustrated in which the channel wall at the lower edge position P1 in the gravitational direction extends in the horizontal direction, as long as the channel wall at the lower edge position P1 in the gravitational direction is parallel to the direction of fluid movement, the direction in which the channel wall extends is not limited to the horizontal direction and may be a direction that inclines with respect to the vertical direction.

(Setting of Ratio A Based on Relation Between Drag Reduction Rate $R_D$ and Ratio A)

FIG. 4 is a view for describing a setting relating to the shape of the channel of the inner pipe 12 of the fluid transport pipe 10 shown in FIG. 1. FIG. 4 illustrates the relation between a rate of reduction in total drag that acts inside the fluid transport pipe 10 (hereunder, referred to simply as "drag reduction rate") $R_D$ and a ratio A (=L/((Smax)$^{1/2}$-(Smin)$^{1/2}$)). Here, the ratio A is a ratio that is obtained by dividing a total channel length L of the first unit channel 12a and the second unit channel 12b by a difference between the root of the maximum area Smax and the root of the minimum area Smin.

As shown in FIG. 4, the drag reduction rate $R_D$ changes if the shape of the fluid transport pipe is changed by changing either one of or both of the denominator (channel length L) and numerator ((Smax)$^{1/2}$-(Smin)$^{1/2}$) of the ratio A. The shape of a reference pipe (that is, the shape of a fluid transport pipe when the drag reduction rate $R_D$ is zero) that serves as a standard for evaluating the shape of the fluid transport pipe 10 taking the drag reduction rate $R_D$ as an index is defined as follows. That is, the above described reference pipe corresponds to a pipe in which its channel cross-sectional area is constant at an average channel cross-sectional area of a channel cross-section where the channel cross-sectional area continuously changes within a range from the maximum area Smax to the minimum area Smin in a pair of unit channels 12a and 12b, and in which the center line of the channel is a straight line, and in which the total channel length of the pipe is equal to the total channel length of the fluid transport pipe 10.

Based on FIG. 4 it is understood that if the ratio A is set within a certain range (hereunder, referred to as "target range B"), the drag reduction rate $R_D$ exhibits a positive value. That is, it is found that in a fluid transport pipe for which the ratio A that is within the target range B was selected, a reduction in the total drag in comparison to the above described reference pipe is achieved. A summary of the reason that such a reduction in the drag is possible is as follows. The fact that the ratio A is small means that the channel shape of the pair of unit channels is a shape in which a rate of change in the channel cross-sectional area is large. If the ratio A decreases, the pressure drag increases. On the other hand, in the target range B, a decrease in the friction drag exceeds an increase in the pressure drag. Therefore, a reduction in the total drag is possible in the target range B. A detailed description relating to reduction of the total drag by adjustment of the ratio A is described in the aforementioned Non Patent Literatures 1 and 2.

For the fluid transport pipe 10 of the present embodiment, utilizing the findings concerning the relation between the drag reduction rate $R_D$ and the ratio A described above with reference to FIG. 4, the ratio A is set within the target range B in which the drag reduction rate $R_D$ becomes a positive value. More specifically, as shown in FIG. 4, there is a region in which the drag reduction rate $R_D$ becomes particularly large within the target range B, and such a preferable region can be ascertained by simulation or experimentation. Accordingly, based on the result of simulation or the like utilizing the above findings, the shape of the fluid transport pipe 10 can be determined using the ratio A with which a reduction in drag can be achieved. Further, regardless of the kind of fluid that is the transportation object, the relation between the drag reduction rate $R_D$ and the ratio A is the same with regard to the fundamental tendency. However, the target range B itself varies according to the Reynolds number of the flow field that is the object. The Reynolds number is set based on the flow rate and the viscosity and density of the fluid. Therefore, the ratio A is determined by taking into consideration the Reynolds number of the flow field that is the object.

(Configuration for Obtaining Further Drag Reduction Effect)

The description of the configuration of the fluid transport pipe 10 will now be continued referring again to FIG. 1 to FIG. 3. Inside the fluid transport pipe 10 having the double pipe structure configured as described above, a space exists that is surrounded by the outer wall of the inner pipe 12 and the inner wall of the outer pipe 14. In the fluid transport pipe 10 of the present embodiment, this space is utilized as a bypass channel 20 for a flow from the first unit channel 12a to the second unit channel 12b.

More specifically, in order to utilize the above described space as the bypass channel 20, a first slit 22a is formed at a site that is located on an inner side in the radial direction relative to the inner wall of the maximum area portion 16 in the channel wall of the first unit channel 12a, and a second slit 22b is formed at a site that is located on an inner side in the radial direction relative to the inner wall of the maximum area portion 16 in the channel wall of the second unit channel 12b. As described above, in the fluid transport pipe 10, the channel wall at the lower edge position P1 in the gravitational direction is parallel to the direction of fluid movement. Therefore, the shape of the channel wall at a site other than the lower edge position P1 in the first unit channel 12a changes accompanying a positional change in the direction of fluid movement (more specifically, changes so that the channel becomes progressively narrower toward the downstream side). According to the present embodiment, the first slit 22a is formed at a site in the channel wall at which a change in the channel cross-section accompanying movement of the flow becomes a maximum amount in the circumferential direction (in the fluid transport pipe 10, a site on the upper edge side in the gravitational direction). In the second unit channel 12b, the second slit 22b is formed at a similar site. However, in the case of the second unit channel 12b, the shape of the channel wall at a site other than the lower edge position P1 changes so as to progressively widen the channel toward the downstream side. These slits 22a and 22b are formed as openings that extend along the direction of fluid movement (in other words, the main flow direction of the fluid that flows inside the inner pipe 12). Note that, although in this case a configuration is exemplified in which one each of the slits 22a and 22b are provided, a plurality of each of the slits 22a and 22b may be provided in accordance with the specifications of the fluid transport pipe.

The bypass channel 20 constructed as described above allows communication between the first slit 22a and the second slit 22b that are adjacent in a form in which the minimum area portion 18 is interposed between the first slit 22a and the second slit 22b. As a result, part of the fluid that flows through the first unit channel 12a flows into the bypass channel 20 through the first slit 22a and thereafter passes through the second slit 22b to merge with the fluid that flows through the second unit channel 12b. Thus, because of the presence of the slits 22a and 22b, the above described space allows the unit channels 12a and 12b to communicate with each other and thus functions as the bypass channel 20.

(Effect of Fluid Transport Pipe According to Embodiment 1)

According to a fluid transport pipe in which its channel cross-sectional area periodically increases and decreases as in the inner pipe 12 of the fluid transport pipe 10, a reduction in drag can be achieved by making the flow approach a laminar flow by causing the main flow to pulsate. More specifically, the channel on the decreasing side of the channel cross-section is a site at which it is desired to suppress the generation of turbulence as much as possible to achieve laminarization of the flow. On the other hand, since, in the channel on the increasing side of the channel cross-section, turbulence grows together with movement of the flow, this channel corresponds to a site at which it is desired to suppress turbulization of the flow that is caused by turbulence growth. By providing the bypass channel 20 in the fluid transport pipe 10 of the present embodiment, as described hereunder, turbulence growth in the second unit channel 12b that is on the increasing side can be suppressed while favorably maintaining the flow laminarization effect that is achieved by the first unit channel 12a that is on the decreasing side. As a result, a further drag reduction effect can be achieved.

Figure 5A:
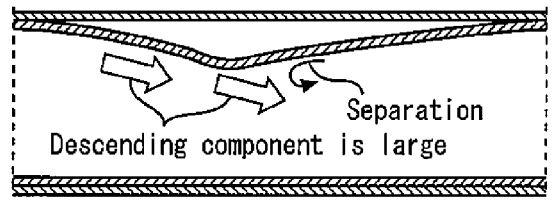
FIG. 5(A) and FIG. 5(B) are views for describing an effect obtained by providing a bypass channel.
Figure 5B:
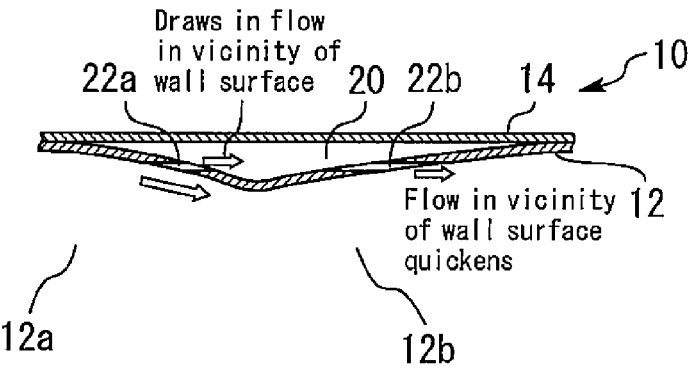

FIG. 5(A) and FIG. 5(B) are views for describing a result that is obtained by providing the bypass channel 20. FIG. 5(A) is a view that illustrates the configuration of a fluid transport pipe that is referred to for comparison with the fluid transport pipe 10 of the present embodiment. In the case of the fluid transport pipe that does not include a bypass channel as shown in FIG. 5(A), if there is a site at which the channel wall surface inclines significantly for the purpose of reducing the channel cross-sectional area, a component at which the flow direction is changed (a descending component in FIG. 5(A)) is large. When the direction of the flow is bent to a large degree in this manner, it leads to an increase in the pressure drag. Furthermore, at a site at which the channel cross-sectional area begins to increase again thereafter, separation of the flow is liable to be generated in the vicinity of the wall surface.

In contrast, in the case of the fluid transport pipe 10 of the present embodiment, as shown in FIG. 5(B), part of the flow inside the first unit channel 12a flows into the bypass channel 20 through the first slit 22a. As a result, a component at which the flow direction is changed (a descending component in FIG. 5(A)) is small. Therefore, an increase in pressure drag (profile drag) can be suppressed. By this means, separation of the flow in the vicinity of the wall surface of the second unit channel 12b at which the channel cross-sectional area begins to increase again thereafter is suppressed, and an increase in the friction drag can thus be suppressed.

Further, in general, a site in the vicinity of a wall surface inside a pipe is a site at which turbulence is large in comparison to a flow (that is, the main flow) at a position that is separated from the wall surface. By providing the bypass channel 20 having the above described configuration, in the first unit channel 12a that is on the decreasing side of the channel cross-section, part of the flow in the vicinity of the wall surface with respect to which the turbulence is relatively large can be taken into the bypass channel 20 (more specifically, can be pushed into the bypass channel 20 by the dynamic pressure of the fluid). Thus, a factor that leads to turbulence growth is removed from inside the first unit channel 12a. Consequently, the turbulence inside the first unit channel 12a can be further suppressed.

In addition, the following advantageous effect can be obtained by providing the bypass channel 20 in the second unit channel 12b. That is, in the second unit channel 12b that is on the increasing side of the channel cross-section, a velocity boundary layer in the vicinity of the wall surface grows as the flow velocity progressively decreases in the downstream direction. According to the bypass channel 20, a flow can spurt out from the bypass channel 20 with respect to the velocity boundary layer in the vicinity of the wall surface (more specifically, since the outlet of the second slit 22b is at a negative pressure, the fluid inside the bypass channel 20 is sucked out into the second unit channel 12b by the negative pressure). Since the flow in the vicinity of the wall surface quickens due to the inflow of fluid into the second unit channel 12b from the bypass channel 20, the velocity boundary layer becomes thin. Consequently, turbulence inside the second unit channel 12b can be further suppressed.

In addition, the fluid transport pipe 10 of the present embodiment adopts a double pipe structure that includes, as the inner pipe 12, a pipe in which the channel cross-sectional area periodically increases and decreases, and that includes, as the outer pipe 14, a pipe having an inner wall into which an outer wall of the maximum area portion 16 of the inner pipe 12 is fitted. Thus, the bypass channel 20 can be formed utilizing a space that is formed between the outer wall of the inner pipe 12 and the inner wall of the outer pipe 14. Consequently, manufacture of the fluid transport pipe including the bypass channel is facilitated. Further, by adopting the double pipe structure, a higher level of rigidity of the fluid transport pipe 10 can be secured in comparison to a case in which a single pipe corresponding to the inner pipe 12 is provided as a fluid transport pipe.

Further, in the inner pipe 12 of the fluid transport pipe 10, as shown in FIG. 2(A) and FIG. 2(B), the channel center of the maximum area portion 16 and the channel center of the minimum area portion 18 are eccentric in the vertical direction. Therefore, in comparison to a case of a fluid transport pipe in which a channel center of a maximum area portion and a channel center of a minimum area portion are on the same straight line that is parallel to the direction of fluid movement as in an inner pipe 82 of a fluid transport pipe 80 shown in FIG. 11(A) and FIG. 11(B) that are described later, a change in the channel wall shape in the horizontal direction that accompanies a change in the channel cross-section decreases. Consequently, the bending strength in the horizontal direction can be improved.

Further, in the inner pipe 12 of the fluid transport pipe 10, the channel wall at the lower edge position P1 in the gravitational direction is parallel to the direction of fluid movement. As a result, unevenness can be eliminated from the channel wall at the lower portion in the gravitational direction of the inner pipe 12. By this means, in a case where the fluid that is the transportation object is a gas, if a pipe in which condensed water can arise inside the pipe, such as an intake pipe of an internal combustion engine, is provided as the inner pipe 12, gas can be allowed to flow without condensed water stagnating at the lower portion in the gravitational direction of the inner pipe 12. This makes it possible to suppress a decline in performance that is due to an apparent decrease in the channel cross-sectional area, and can also suppress corrosion of the pipe wall that is caused by a convergence of condensed water.

Further, in the fluid transport pipe 10, the first slit 22*a* is formed as an opening along the direction of fluid movement. It is thereby possible for part of the flow to be favorably introduced into the bypass channel 20 utilizing the dynamic pressure of the fluid.

Further, in the fluid transport pipe 10, the slits 22*a* and 22*b* are formed not at sites in the vicinity of the maximum area portion 16 at which a change in the channel cross-section is relatively gradual, but rather are formed at sites where the aforementioned change is relatively abrupt (sites near the minimum area portion 18). By this means, an advantageous effect of suppressing an increase in the pressure drag that is described above referring to FIG. 5(A) and FIG. 5(B) and an advantageous effect of further suppressing the turbulence can be more efficiently obtained.

Embodiment 2

Next, Embodiment 2 of the present invention will be described referring to FIG. 6.

Figure 6:
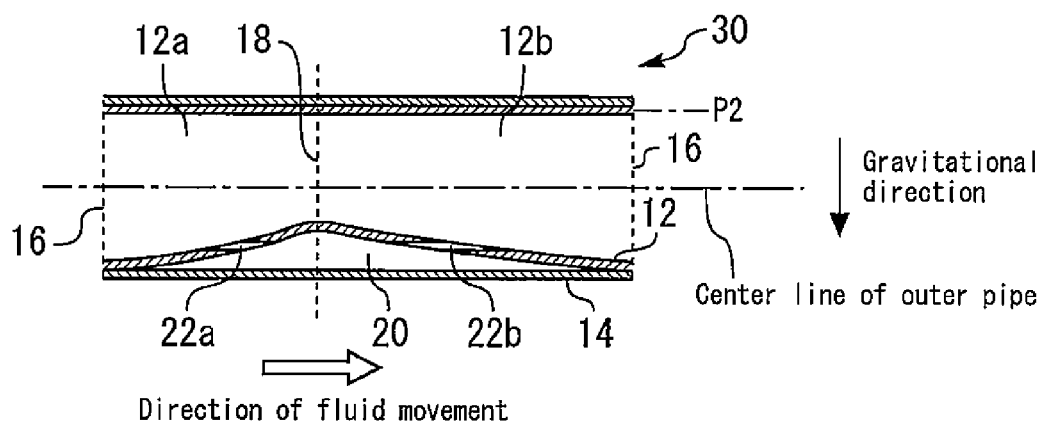
FIG. 6 is a longitudinal section illustrating one portion of a fluid transport pipe according to Embodiment 2 of the present invention.

FIG. 6 is a longitudinal section illustrating one part of a fluid transport pipe 30 according to Embodiment 2 of the present invention. The fluid transport pipe 30 of Embodiment 2 is identical to the fluid transport pipe 10 of Embodiment 1 with respect to the basic shape thereof. As one example, the fluid that is the object of transportation by the fluid transport pipe 30 of Embodiment 2 is taken to be a liquid, not a gas. As specific application examples, in the case of an internal combustion engine, for example, the fluid transport pipe 30 can be applied to a fuel pipe for transporting a liquid fuel, a cooling water pipe for transporting engine cooling water, or a lubricating oil pipe for transporting engine lubricating oil.

The fluid transport pipe 30 of the present embodiment differs from the fluid transport pipe 10 of Embodiment 1 with respect to the orientation of the pipe at a time of use (in the case of machinery such as an internal combustion engine, at a time that the pipe is mounted in the engine). That is, as shown in FIG. 6, the fluid transport pipe 30 is used (mounted) at an orientation such that the upper side and lower side in the gravitational direction are inverted relative to the fluid transport pipe 10. Consequently it can be said that, in the inner pipe 12 of the fluid transport pipe 30, the channel is formed so that upper edge positions P2 in the gravitational direction in the respective channel cross-sections of the pair of unit channels 12*a* and 12*b* are aligned on a straight line that is parallel to the direction of fluid movement. In other words, it can be said that, in the inner pipe 12, the channel wall at the upper edge position P2 in the gravitational direction is parallel to the direction of fluid movement. Note that, in this case, although a configuration example is illustrated in which the channel wall at the upper edge position P2 in the gravitational direction extends in the horizontal direction, as long as the channel wall at the upper edge position P2 in the gravitational direction is parallel to the direction of fluid movement, the direction in which the channel wall extends is not limited to the horizontal direction and may be a direction that inclines with respect to the vertical direction.

According to the above described configuration, unevenness can be eliminated from the channel wall in the upper portion in the gravitational direction of the inner pipe 12. By this means, when the fluid that is a transportation object is a liquid, even if air becomes mixed into or arises in the flow, the liquid can be allowed to flow without air stagnating in the upper portion in the gravitational direction of the inner pipe 12. This makes it possible to suppress a decline in performance that is due to an apparent decrease in the channel cross-sectional area.

Embodiment 3

Next, Embodiment 3 of the present invention will be described referring to FIG. 7.

Figure 7:
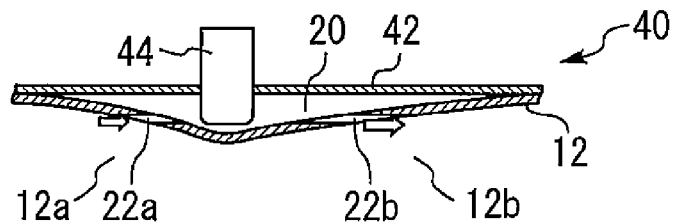
FIG. 7 is a view for describing a feature portion of a fluid transport pipe according to Embodiment 3 of the present invention.

FIG. 7 is a view for describing a feature portion of a fluid transport pipe 40 according to Embodiment 3 of the present invention. Except for the difference described hereunder, the fluid transport pipe 40 according to Embodiment 3 has the same structure as the fluid transport pipe 10 or 30 according to Embodiment 1 or 2, respectively. That is, a sensor 44 that detects a parameter (temperature, pressure, flow rate or the like) of a fluid (a gas or a liquid) that flows through the bypass channel 20 is mounted in an outer pipe 42 of the fluid transport pipe 40. More specifically, as an example of a preferable arrangement, in FIG. 7, the tip of the sensor 44 is inserted into the bypass channel 20 in a section from the first slit 22*a* to the second slit 22*b* in the direction of fluid movement.

Fundamentally, if a protruding object such as a sensor is placed in the flow of a fluid, the turbulence of the flow will increase. In the fluid transport pipe 40 of the present embodiment in which it is necessary to provide the sensor 44, the sensor 44 is provided on the bypass channel 20 side. Therefore, detection of a parameter of a fluid can be performed without imparting turbulence to the main flow inside the unit channels 12*a* and 12*b*.

Embodiment 4

Next, Embodiment 4 of the present invention will be described referring to FIG. 8.

Figure 8:
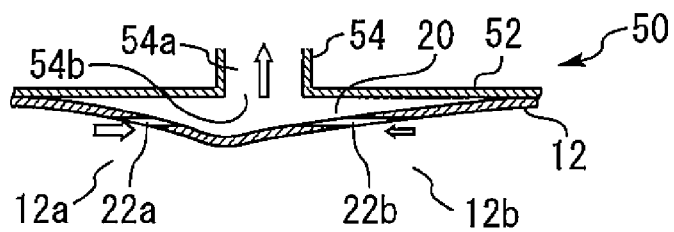
FIG. 8 is a view for describing a feature portion of a fluid transport pipe according to Embodiment 4 of the present invention.

FIG. 8 is a view for describing a feature portion of a fluid transport pipe 50 according to Embodiment 4 of the present invention. Except for the difference described hereunder, the fluid transport pipe 50 according to Embodiment 4 has the same structure as the fluid transport pipe 10 or 30 according to Embodiment 1 or 2, respectively. That is, a branch pipe 54 having a branch channel 54*a* that branches from the bypass channel 20 is connected to an outer pipe 52 of the fluid transport pipe 50. In a case where the fluid transport pipe 50 is applied to an exhaust pipe of an internal combustion engine, the branch pipe 54 corresponds, for example, to an EGR pipe. More specifically, as a preferable configuration example, an opening 54b of the branch pipe 54 is formed in a wall surface of the outer pipe 52 in a section from the first slit 22a to the second slit 22b in the direction of fluid movement.

In a case where a flow is branched, the flow that branches is a siphon flow. In the case of drawing out some of a flow in a direction that is perpendicular to the flow, since only a static pressure acts on the branch channel, the diverted flow amount is small and separation of the flow arises at an edge portion of the branch channel, and this is a factor that increases the friction drag. According to the fluid transport pipe 50 of the present embodiment, the flow is caused to branch from the bypass channel 20. By this means, the flow can be caused to branch without imparting the influence of the separation with respect to the flow within the inner pipe 12. Further, according to the present configuration, by appropriately adjusting the orientation of the first slit 22a it is also possible to split the flow in an efficient manner utilizing a dynamic pressure that acts on the first slit 22a. Note that, since a negative pressure is acting on the second slit 22b side, the inflow amount of the flow from the second slit 22b into the bypass channel 20 is small. Accordingly, it is considered that there is no increase in turbulence on the second unit channel 12b side.

Embodiment 5

Next, Embodiment 5 of the present invention will be described referring to FIG. 9.

Figure 9:
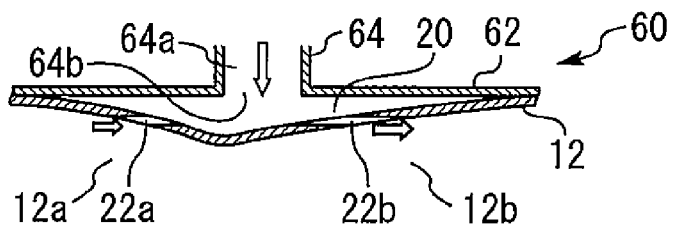
FIG. 9 is a view for describing a feature portion of a fluid transport pipe according to Embodiment 5 of the present invention.

FIG. 9 is a view for describing a feature portion of a fluid transport pipe 60 according to Embodiment 5 of the present invention. Except for the difference that is described hereunder, the fluid transport pipe 60 according to Embodiment 5 has the same structure as the fluid transport pipe 10 or 30 according to Embodiment 1 or 2, respectively. That is, a confluence pipe 64 having a merging channel 64a that merges with the bypass channel 20 is connected to an outer pipe 62 of the fluid transport pipe 60. In a case where the fluid transport pipe 60 is applied to an intake pipe of an internal combustion engine, the confluence pipe 64 corresponds, for example, to an EGR pipe. More specifically, as a preferable configuration example, an opening 64b of the confluence pipe 64 is formed in a wall surface of the outer pipe 62 in a section from the first slit 22a to the second slit 22b in the direction of fluid movement.

In the case of causing a flow to merge, the flow that merges is a blowout flow. Similarly to a case where a projecting object placed in the flow of a fluid, such a blowout flow becomes a factor that increases turbulence. Therefore, in order to cause the blowout flow to merge while keeping the influence of turbulence as small as possible, it is necessary to cause the blowout flow to merge along the flow. According to the fluid transport pipe 60 of the present embodiment, by causing the flow to merge in the bypass channel 20, a merged flow is introduced into the second unit channel 12b through the second slit 22b. By this means, a flow can be merged without inhibiting as far as possible the orientation of the flow inside the inner pipe 12. Note that, a dynamic pressure of a flow from the first unit channel 12a side acts on the first slit 22a that is on the decreasing side. Therefore, it is considered that almost none of the merged flow spurts out through the first slit 22a, and thus there is no increase in turbulence on the first unit channel 12a side.

Other Embodiments

Figure 10:
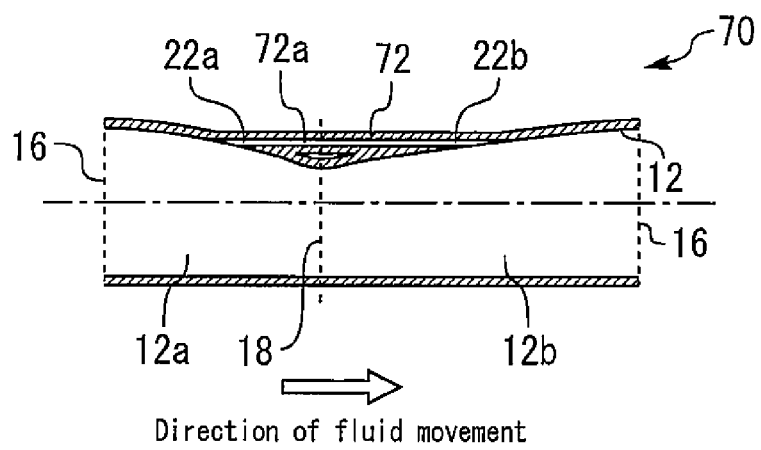
FIG. 10 is a view illustrating a fluid transport pipe according to a modification example of the present invention.

FIG. 10 is a view illustrating a fluid transport pipe 70 according to a modification example of the present invention. The fluid transport pipe 70 shown in FIG. 10 is a pipe that is constructed by alternately linking the first unit channel 12a and the second unit channel 12b without adopting a double pipe structure. As in a bypass channel 72 shown in this example, a bypass channel that allows the first slit 22a and the second slit 22b to communicate with each other may be a channel that is formed on outside of the first unit channel 12a and the second unit channel 12b, and may be constituted by a bypass pipe 72 that connects a wall of the first unit channel 12a and a wall of the second unit channel 12b. Here, a straight pipe that extends linearly is illustrated as one example of the bypass pipe 72. If the bypass pipe 72 is a straight pipe, the first slit 22a and the second slit 22b are linked using the shortest distance therebetween. However, a bypass channel in the present invention is not necessarily limited to a bypass channel that links the first opening and the second opening using the shortest distance therebetween as in the above described example of the straight pipe. Note that, the number of bypass pipes 72 provided in the fluid transport pipe 70 may be set as one or an arbitrary plural number in accordance with the specifications of the fluid transport pipe.

Figure 11:
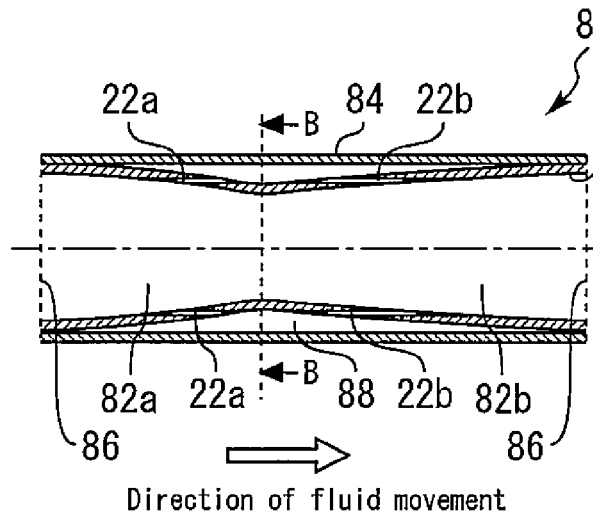
FIG. 11(A) and FIG. 11(B) is a view are views illustrating a fluid transport pipe according to a modification example of the present invention.
Figure 11:
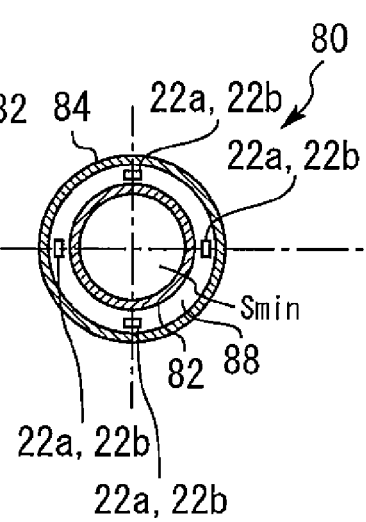

FIG. 11(A) and FIG. 11(B) are views illustrating a fluid transport pipe 80 according to a modification example of the present invention. The fluid transport pipe 80 shown in FIG. 11(A) and FIG. 11(B) is a double pipe that includes, as an inner pipe 82, a pipe obtained by linking a first unit channel 82a and a second unit channel 82b in an alternating manner, and that includes, as an outer pipe 84, a pipe having an inner wall into which an outer wall of a maximum area portion 86 in the inner pipe 82 is fitted. This example differs from the fluid transport pipe 10 of Embodiment 1 in the respect that the fluid transport pipe 80 is configured so that the channel cross-section of the inner pipe 82 periodically increases and decreases in a form in which the center line of the channel cross-section becomes a straight line. Further, in this example, a space that is enclosed by an outer wall of the inner pipe 82 and an inner wall of the outer pipe 84 is utilized as a bypass channel 88. However, with respect to a bypass channel of a fluid transport pipe in which the channel cross-section changes in the manner shown in this example, for example, the bypass channel may be constructed by a similar technique as in the example illustrated in FIG. 10, and without adopting a double pipe structure.

Figure 12:
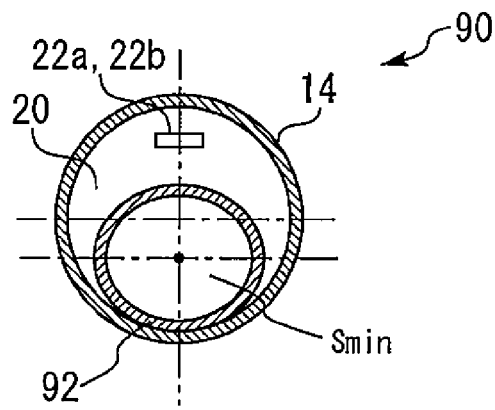
FIG. 12 is a view illustrating a channel cross-section of a fluid transport pipe according to a modification example of the present invention.

FIG. 12 is a view illustrating a channel cross-section of a fluid transport pipe 90 according to a modification example of the present invention. The fluid transport pipe 90 shown in FIG. 12 differs from the fluid transport pipe 10 in which the channel cross-sectional shape of the inner pipe 12 is a circle, in the respect that that the channel cross-sectional shape of an inner pipe 92 is an ellipse. As shown in this example, the channel cross-sectional shape of a pipe in which the channel cross-section periodically increases and decreases according to the present invention may also be an arbitrary shape other than a circle. This is regardless of whether or not the fluid transport pipe adopts a double pipe structure, and similarly applies to a fluid transport pipe in which the channel cross-section changes in the manner illustrated in FIG. 11(A) and FIG. 11(B).

By making the channel cross-sectional shape of the inner pipe 92 an ellipse, in comparison to the inner pipe 12 that uses a circular shape, changes in the channel wall shape in the horizontal direction that accompany a change in the channel cross-section can be made smaller. Consequently, the bending strength in the horizontal direction can be efficiently improved.

Figure 13:
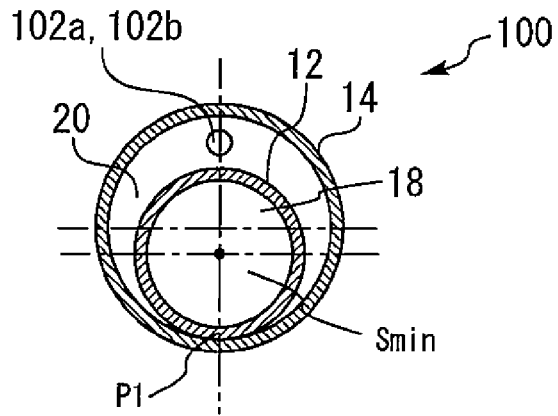
FIG. 13 is a view illustrating a channel cross-section of a fluid transport pipe according to a modification example of the present invention.

FIG. 13 is a view that illustrates a channel cross-section of a fluid transport pipe 100 according to a modification example of the present invention. The fluid transport pipe 100 shown in FIG. 13 differs from the fluid transport pipe 10 that utilizes the slits 22a and 22b having an angular cross-section, in the respect that first and second openings formed in the wall surfaces of the first and second unit channels 12a and 12b, respectively, are a circular first communicating hole 102a and a circular second communicating hole 102b.

Figure 14:
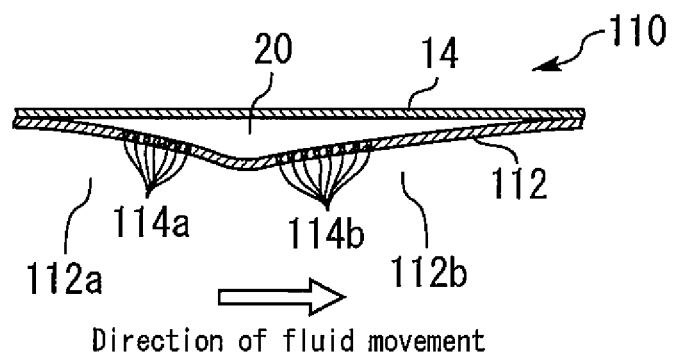
FIG. 14 is a view illustrating a channel cross-section of a fluid transport pipe according to a modification example of the present invention.

FIG. 14 is a view illustrating a channel cross-section of a fluid transport pipe 110 according to a modification example of the present invention. The fluid transport pipe 110 illustrated in FIG. 14 differs from the fluid transport pipe 10 of Embodiment 1 with respect to the direction in which a first slit 114a and a second slit 114b are formed in the inner pipe 112. More specifically, while the slits 22a and 22b or the communicating holes 102a and 102b of the above described examples are formed as openings along the direction of fluid movement, the slits 114a and 114b of this example are formed as openings along the thickness direction of the inner pipe 112. According to the technique for forming the slits 114a and 114b of this example, the inner pipe 112 can be manufactured by performing processing for obtaining the shape of the inner pipe 112 after forming the slits 114a and 114b in a plate-like material. Therefore, the productivity with respect to manufacturing the inner pipe 112 can be increased. However, since the direction of forming the slits 114a and 114b does not match the direction of movement of the flow, if the same cross-sectional areas are compared, the amount of gas that passes through the slits 114a and 114b is less than in the case of the slits 22a and 22b. Accordingly, it is necessary to increase the number of slits relative to the number of the slits 22a and 22b. Note that, the technique of this example may also be used in the case of utilizing communicating holes instead of slits as the first and second openings.

Further, the first and second openings of the present invention are not limited to slits or communicating holes. For example, the first and second openings may be obtained by providing a porous body (for example, steel wool) in the channel wall.

Figure 15:
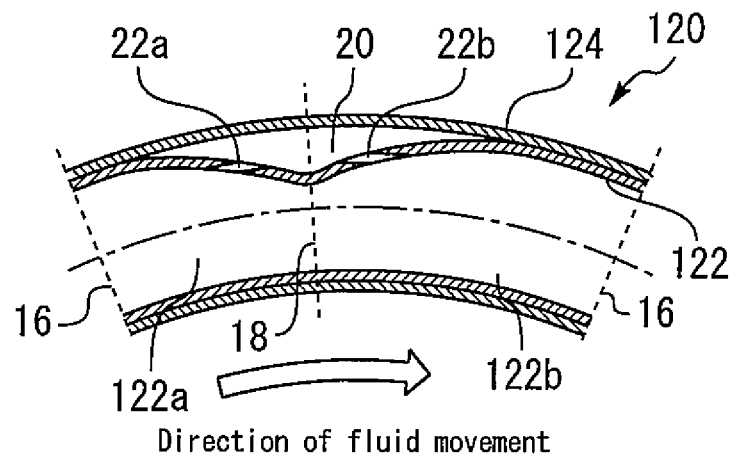
FIG. 15 is a view illustrating a channel cross-section of a fluid transport pipe according to a modification example of the present invention.

FIG. 15 is a view illustrating a channel cross-section of a fluid transport pipe 120 according to a modification example of the present invention. The fluid transport pipe 120 illustrated in FIG. 15 has, as one example, a double pipe structure formed by an inner pipe 122 and an outer pipe 124, and is constructed as a bent pipe having a basic shape in which the direction of fluid movement changes. Thus, the fluid transport pipe of the present invention is not limited to the fluid transport pipe 10 or the like that is a straight pipe in which the direction of fluid movement is linear, and may also be applied to a bent pipe. Even when applied to a bent pipe, a drag reduction effect that is mainly caused by a reduction in friction drag can be obtained. Note that, the "reference pipe" of the present invention in a case where a bent pipe is taken as an object can be set in the following manner for example. That is, as a reference pipe in this case, a pipe can be mentioned in which its channel cross-sectional area is constant at an average channel cross-sectional area of a channel cross-section in which the channel cross-sectional area continuously changes within a range from a maximum area Smax to a minimum area Smin in a pair of unit channels 122a and 122b, and in which its channel center line is a curve that is parallel to a direction of fluid movement in the fluid transport pipe 120 and in which the overall channel length of the pipe is equal to that of the fluid transport pipe 120.

REFERENCE SIGNS LIST 10, 30, 40, 50, 60, 70, 80, 90, 100, 110, 120 Fluid transport pipe
12, 82, 92, 112, 122 Inner pipe
12a, 82a, 122a First unit channel
12b, 82b, 122b Second unit channel
14, 42, 52, 62, 84, 124 Outer pipe
16, 86 Maximum area portion
18 Minimum area portion
20, 72a, 88 Bypass channel
22a, 114a First slit
22b, 114b Second slit
44 Sensor
54 Branch pipe
54a Branching channel
54b Opening of branch pipe
64 Confluence pipe
64a Merging channel
64b Opening of confluence pipe
72 Bypass pipe
102a First communicating hole
102b Second communicating hole

What is claimed is:
1. A fluid transport pipe, comprising:
a first unit channel in which a channel cross-sectional area continuously decreases toward a downstream side, and
a second unit channel that is a unit channel that is alternately combined with the first unit channel, and in which a channel cross-sectional area continuously increases toward the downstream side,
wherein the fluid transport pipe is configured so that, in a relation between a ratio obtained by dividing a total channel length of the first unit channel and the second unit channel by a difference between a root of a maximum area of a channel cross-section of the fluid transport pipe and a root of a minimum area of the channel cross-section, and a rate of reduction in a total drag that acts inside the fluid transport pipe in comparison to a reference pipe that is defined as described hereunder, the ratio is set within a range in which the rate of reduction in the total drag becomes a positive value,
wherein the reference pipe corresponds to a pipe in which a channel cross-sectional area thereof is constant at an average channel cross-sectional area of a channel cross-section of a pair of the first unit channel and the second unit channel, and in which a total channel length of the pipe is equal to a total channel length of the fluid transport pipe, and
wherein the fluid transport pipe further comprises:
a first opening that is formed in a channel wall of the first unit channel at a site that is located on an inner side in a radial direction relative to an inner wall of a maximum area portion at which the maximum area is obtained;

a second opening that is formed in a channel wall of the second unit channel at a site that is located on an inner side in a radial direction relative to the inner wall of the maximum area portion; and a bypass channel that is formed on an outer side of the first unit channel and the second unit channel, and that allows communication between the first opening and the second opening that are adjacent in a form in which a minimum area portion at which the minimum area is obtained is interposed between the first opening and the second opening.

2. The fluid transport pipe according to claim 1, wherein the fluid transport pipe is a double pipe including, as an inner pipe, a pipe that is obtained by alternately combining the first unit channel and the second unit channel, and including, as an outer pipe, a pipe having an inner wall into which an outer wall of the maximum area portion in the inner pipe is fitted.

3. The fluid transport pipe according to claim 2, wherein a sensor that detects a parameter of a fluid that flows through the bypass channel is mounted in the outer pipe.

4. The fluid transport pipe according to claim 2, wherein a branch pipe having a branch channel that branches from the bypass channel is connected to the outer pipe.

5. The fluid transport pipe according to claim 2, wherein a confluence pipe having a merging channel that merges with the bypass channel is connected to the outer pipe.

6. The fluid transport pipe according to claim 1, wherein a fluid that is an object of transportation by the fluid transport pipe is a gas, wherein a direction of movement of a fluid is a horizontal direction or is an inclined direction relative to a vertical direction, and wherein a channel wall at a lower edge position in a gravitational direction in the first unit channel and the second unit channel is parallel to the direction of movement.

7. The fluid transport pipe according to claim 1, wherein a fluid that is an object of transportation by the fluid transport pipe is a liquid, wherein a direction of movement of a fluid is a horizontal direction or is an inclined direction relative to a vertical direction, and wherein a channel wall at an upper edge position in a gravitational direction in the first unit channel and the second unit channel is parallel to the direction of movement.

* * * * *